Nov. 22, 1955 — D. P. CROOKSHANK — 2,724,360
BATTERY VENT CAP FLUID LEVEL INDICATOR
Filed March 12, 1953
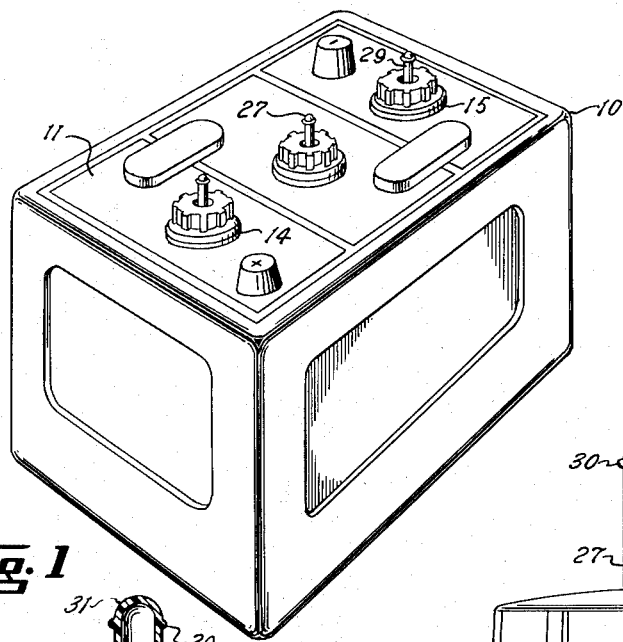
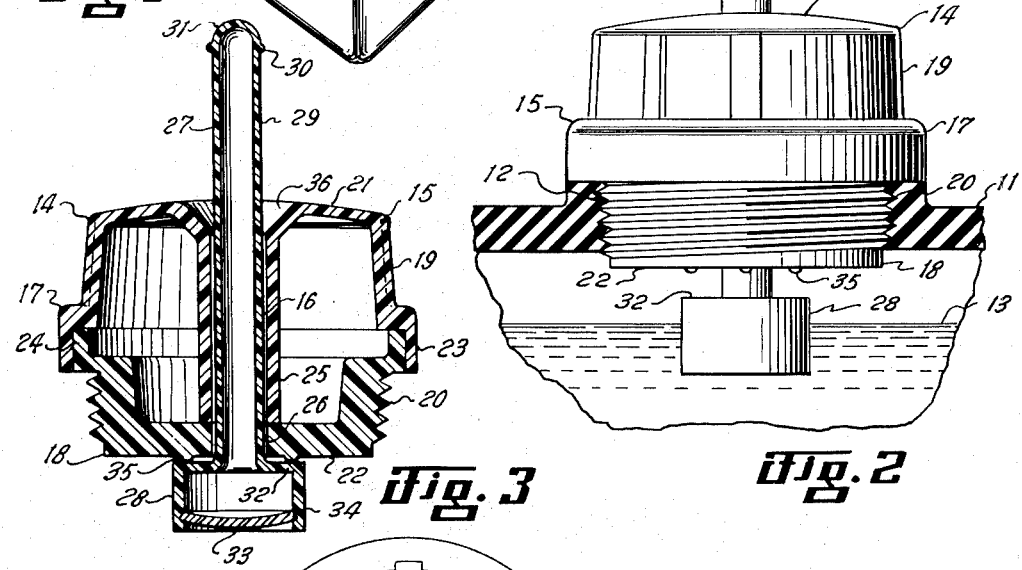
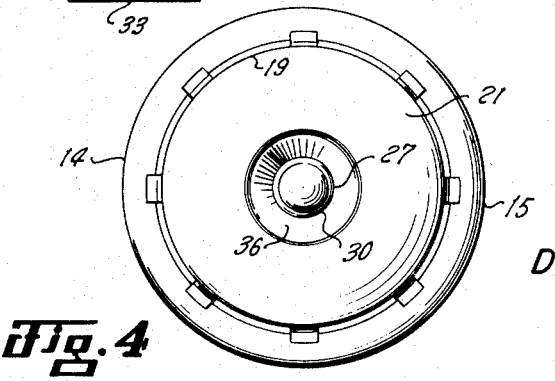
INVENTOR.
Donald P. Crookshank
BY
Ashley & Ashley
ATTORNEYS

United States Patent Office 2,724,360
Patented Nov. 22, 1955

2,724,360

BATTERY VENT CAP FLUID LEVEL INDICATOR

Donald P. Crookshank, Henderson, Tex., assignor to W. V. Stroud, trustee, Rusk County, Tex.

Application March 12, 1953, Serial No. 341,974

2 Claims. (Cl. 116—118)

This invention relates to new and useful improvements in storage battery vent caps and more particularly to a fluid level indicator carried by a battery vent cap.

One object of the invention is to provide an improved storage battery vent cap having a float-type indicator associated therewith for determining the fluid level without removal of or touching the cap whereby said fluid level may be more readily maintained above the tops of the battery plates so as to prolong the life of the battery.

Another battery of the invention is to provide an improved indicator for a wet storage battery having a float carried by and forming a part of a battery vent cap for visibly indicating the fluid level of the battery cell closed by the cap so as to facilitate observation of said fluid level and maintenance of the battery.

A further object of the invention is to provide an improved combination battery vent cap and fluid level indicator which includes a cap having an axial bore and a float having an upstanding stem slidably engaged and supported in the cap bore whereby the float depends into the battery cell closed by the cap and the stem projects above said cap to visibly indicate the fluid level of said cell.

A particular object of the invention is to provide an improved battery vent cap-indicator, of the character described, wherein clearance is provided between the battery vent cap and float and its stem to form a vent for the battery cell, the stem being confined in the cap bore against accidental separation from said cap and preferably being formed of flexible material to permit distortion and removal of said stem with the float.

A construction designed to carry out the invention will be hereinafter described together with other features of the invention.

The invention will be more readily understood from a reading of the following specification and by reference to the accompanying drawing, wherein an example of the invention is shown, and wherein:

Fig. 1 is a perspective of a wet storage battery having combination battery vent caps and fluid level indicators constructed in accordance with the invention, Fig. 2 is an enlarged, transverse, vertical, sectional view of the upper portion of a battery cell having the battery vent cap-indicator mounted in its filler opening.

Fig. 3 is a transverse, vertical, sectional view of the battery vent cap-indicator with its float and stem in their uppermost position, and Fig. 4 is a top plan view of the battery vent cap-indicator.

In the drawing, the numeral 10 designates a conventional multiple wet cell battery. Each cell 11 includes a flanged, screw-threaded filler opening 12 in its top and, as shown by the numeral 13, is adapted to contain a quantity of fluid sufficient to cover the usual plates (not shown). For closing each filler opening 12 and indicating the level of the fluid in its cell 11, a combined battery vent cap and indicator 14 is provided and includes a cap body 15, having an axial bore 16, adapted to be screw-threaded in said opening. Although the construction of the cap body 15 is subject to variation, it is preferable to form the same of upper and lower circular halves or sections 17 and 18 which are hollow or cup-shaped (Fig. 3). As a result, the upper section 17 has a depending peripheral wall or skirt 19 and the lower section 18 has an upstanding peripheral flange or wall 20 which is externally screw-threaded for engagement with the filler opening. A crowned or dished top 21 closes the upper end of the body and its upper section, while a substantially flat bottom 22 closes the lower end of said body and its lower section. For economy of manufacture, the body sections are adapted to be formed of polystyrene or other suitable plastic or material capable of being molded. An annular, outwardly-offset lip 23 depends from the skirt 19 for receiving an upstanding, complementary lip 24 on the flange 20 and the contiguous surfaces of the lips are adapted to be bonded or cemented so as to connect the upper and lower sections of the cap body.

The bore 16 is formed by a cylindrical sleeve or tube 25 depending axially from the cap top 21 into engagement with the cap bottom 22, which has an axial opening 26 alined with said bore. In order to seal off the cavity of the cap body 15, the lower end of the sleeve may be bonded or cemented to the cap bottom. A fluid level indicator 27 of the float-type is adapted to be supported by the cap body and includes a hollow float body element 28 having an upstanding, hollow stem 29. As shown in Fig. 3, the stem is adapted to be slidably confined in the sleeve bore 16 and the opening 26 with the float element underlying the cap body. The length of the stem 29 is greater than the thickness of the cap body whereby said stem projects above and below the cap top and bottom. For supporting the indicator 27 and limiting downward movement thereof relative to the cap body, an enlargement 30 is provided on the upper end portion of the stem and preferably is in the form of an external, annular bead or shoulder having bevelled edges. Above the shoulder 30, the upper extremity of the hollow stem is closed by a rounded cap or tip 31.

Preferably, the float element 28 is made integral with and as a coaxial, radial enlargement of the lower end of the stem so as to provide an upset annular shoulder 32 for engagement with the cap bottom 22. A crowned or dished, circular disk 33 is forced into and bonded or cemented in an internal, annular groove 34 formed in the lower end portion of the float element so as to form a bottom or closure for said element. In order to provide a vent for the cap body, the shoulder 32 is prevented from sealingly engaging the cap bottom by one or more projections or tits 35 preferably made integral with and depending from said bottom. The diameter of the bore 16 and the alined opening 26 is slightly greater than the diameter of the stem so as to provide an annular vent space or clearance therebetween in communication with the space between the cap bottom and shoulder. It is noted that the diameter of the stem shoulder 30 is substantially equal to and not less than the diameter of the bore and opening, whereby the stem may be forced downwardly through said bore and opening to remove the indicator 27 for cleaning when and if necessary. The indicator preferably is formed of polyethylene or other suitable plastic or material sufficiently flexible to permit inward distortion of the stem and facilitate removal of said indicator. In order to accommodate the stem shoulder and permit depressing of the indicator, particularly during shipping, an annular, bevelled recess 36 surrounds the upper end of the bore.

In use, the invention visibly indicates the level of the fluid in a battery cell without removal of the battery cap whereby the quantity of fluid may be readily ascertained and thereby facilitate the maintenance of a battery. Due to the buoyancy of the float element 28, the stem is elevated or projected in accordance with the fluid level whereby the indicator is responsive to said level. Although the float element and stem are preferably hollow so as to have little weight, the requisite buoyancy is the essential factor and may be obtained in other ways. Also, the flexibility of the stem and the removability of the indicator are desirable and not absolutely necessary. As has been explained, the clearance between the stem and bore 16 and between the float element and the cap bottom 22 functions as a vent for the battery vent cap. The hollow construction of the cap body and indicator facilitates manufacture as well as reducing the amount of material used and the weight of the combined battery vent cap and fluid level indicator.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A fluid level indicator for a wet storage battery having a filler opening including, a battery vent cap mountable in a filler opening and having an axial bore, a float stem slidable in the bore and of a length greater than the thickness of the cap so as to project thereabove and therebelow, a flexible enlargement on the upper end portion of the stem for engaging said cap to limit downward movement of said stem relative to said cap, the diameter of said stem being slightly less than the diameter of the cap bore to provide clearance therebetween, float means underlying said cap and mounted on the lower end of said stem, the enlargement of said stem being of a diameter substantially equal to and not less than the diameter of the cap bore so as to permit downward forcing and removal of said stem.

2. A combined battery vent cap and fluid level indicator for a wet storage battery including, a cap body having an axial bore, a float underlying the cap body, an upstanding stem on the float slidable through the bore and projecting above said body, and shoulder means on the upper end portion of the stem for engaging said body and coacting with said float to confine said stem in the said bore, said stem and its shoulder means being formed of flexible material to permit distortion of said shoulder means and downward movement and removal of said stem.

References Cited in the file of this patent

UNITED STATES PATENTS

| | | |
|---|---|---|
| 1,331,165 | Moeller | Feb. 17, 1920 |
| 2,400,228 | Franz | May 14, 1946 |
| 2,504,288 | Wardell | Apr. 18, 1950 |
| 2,550,152 | Kennedy | Apr. 24, 1951 |
| 2,562,604 | Couchey | July 31, 1951 |